US012770070B2

(12) United States Patent
Hazboun

(10) Patent No.: US 12,770,070 B2
(45) Date of Patent: Oct. 20, 2026

(54) SYSTEMS AND METHODS FOR LOW LATENCY NETWORK COMMUNICATIONS

(71) Applicant: AXS Group LLC, Los Angeles, CA (US)

(72) Inventor: Alexander Randolph Hazboun, Los Angeles, CA (US)

(73) Assignee: AXS Group LLC, Los Angeles, CA (US)

( * ) Notice: Subject to any disclaimer, the term of this patent is extended or adjusted under 35 U.S.C. 154(b) by 0 days.

(21) Appl. No.: 19/252,781

(22) Filed: Jun. 27, 2025

(65) Prior Publication Data

US 2025/0348796 A1 Nov. 13, 2025

Related U.S. Application Data

(63) Continuation of application No. 18/658,661, filed on May 8, 2024, now Pat. No. 12,361,342.

(51) Int. Cl.
*G06Q 10/02* (2012.01)
*H04N 21/2187* (2011.01)

(52) U.S. Cl.
CPC ......... *G06Q 10/02* (2013.01); *H04N 21/2187* (2013.01)

(58) Field of Classification Search
CPC ...................................................... G06Q 10/02
See application file for complete search history.

(56) References Cited

U.S. PATENT DOCUMENTS 11,501,586 B1 * 11/2022 Rojas ................. G07C 9/00309
11,863,682 B2 1/2024 Rojas
(Continued)

FOREIGN PATENT DOCUMENTS

CN 113947450 A * 1/2022 ............. G06T 11/00
KR 10-2014-0030707 A 3/2014
(Continued)

OTHER PUBLICATIONS

Caicedo, Felix, Prediction of parking space availability in real time, 2012, Expert Systems with Applications: An International Journal, 39, No. 8, pp. 7281-7290. (Year: 2012).*
(Continued)

*Primary Examiner* — Christopher Gomez
(74) *Attorney, Agent, or Firm* — Knobbe, Martens, Olson & Bear LLP

(57) ABSTRACT

Systems and methods for streaming images are described. A venue seat map is accessed from a data store. A current status of seats rendered in the seat map is accessed from memory. The seat map is updated to indicate the current status. A video stream comprising frames is generated, using a real time protocol, comprising the updated seat map indicating the current status of seats rendered in the seat map. The updated seat map is streamed in real time via the video stream to user device clients. A selection of a seat via the updated seat map is received via a message. A seat token for the selected seat is associated in memory with user. The seat map is updated to indicate a change in status of the selected seat in the seat map. The updated seat map is streamed as a video stream to clients hosted on user devices.

21 Claims, 10 Drawing Sheets

(56) References Cited

U.S. PATENT DOCUMENTS

| | | | | |
|---|---|---|---|---|
| 2007/0245351 | A1* | 10/2007 | Sussman | G06F 9/50 718/104 |
| 2008/0034314 | A1* | 2/2008 | Louch | G06F 3/0481 715/764 |
| 2012/0078667 | A1* | 3/2012 | Denker | G06Q 10/02 705/5 |
| 2012/0084165 | A1* | 4/2012 | Hirose | G06Q 10/02 705/26.1 |
| 2013/0013354 | A1 | 1/2013 | Halavais et al. | |
| 2013/0144665 | A1 | 6/2013 | Denker et al. | |
| 2014/0095223 | A1* | 4/2014 | Oxenham | G06Q 10/02 705/5 |
| 2014/0195277 | A1 | 7/2014 | Kim | |
| 2014/0278610 | A1* | 9/2014 | Carnahan | G06Q 10/02 705/5 |
| 2015/0128163 | A1* | 5/2015 | Cormican | G06F 3/0488 725/23 |
| 2017/0324797 | A1 | 11/2017 | Lee | |
| 2018/0240044 | A1 | 8/2018 | Gibson et al. | |
| 2019/0347694 | A1 | 11/2019 | Gibson et al. | |
| 2020/0036989 | A1* | 1/2020 | Heindel | H04N 19/33 |
| 2020/0096348 | A1 | 3/2020 | Xu et al. | |
| 2020/0104759 | A1 | 4/2020 | Sunshine et al. | |
| 2022/0191348 | A1 | 6/2022 | Sarkar | |
| 2022/0210485 | A1* | 6/2022 | Huang | H04N 21/2187 |
| 2022/0408120 | A1* | 12/2022 | Lazar | H04N 21/2187 |
| 2023/0179421 | A1* | 6/2023 | Rojas | G06F 16/27 713/168 |
| 2023/0300426 | A1* | 9/2023 | Atluru | H04N 21/21805 725/146 |
| 2024/0048655 | A1* | 2/2024 | Zajac | H04M 3/5116 |
| 2024/0086851 | A1 | 3/2024 | Fowler et al. | |
| 2024/0305463 | A1* | 9/2024 | Rojas | H04L 9/3228 |

FOREIGN PATENT DOCUMENTS

| | | | |
|---|---|---|---|
| KR | 10-2015-0116817 | A | 10/2015 |
| KR | 10-1837726 | B1 | 4/2018 |

OTHER PUBLICATIONS

International Search Report and Written Opinion dated Jul. 10, 2025, received in International Patent Application No. PCT/US2025/021582, in 9 pages.

* cited by examiner

SYSTEMS AND METHODS FOR LOW LATENCY NETWORK COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field

The present disclosure generally relates to systems and methods for providing dynamically transmitting changing data in real time to large numbers of clients.

Description of the Related Art

As networked computer resources have become ever more critical, there has been a commensurate rise in peak demand for such resources by clients. Such peak demands often result in significant latencies and in stale data being provided to clients.

Conventional attempts to solve the technical and other challenges presented by such peak demands is for the server providing the data to open a separate socket for each client and to attempt to maintain connections with respective clients to thereby reduce latencies.

Disadvantageously, such conventional techniques put high demands on finite server resources, such as processor, memory, and network resources, leading to degraded performance or system instability. In addition, managing large numbers of sockets simultaneously requires careful synchronization to avoid race conditions and to ensure data consistency. Further, writing concurrent, thread-safe code is complex. This complexity increases the chances of bugs and makes code maintenance more challenging.

Further, blocking I/O operations can make it difficult for a server to efficiently handle multiple connections. For example, if one socket is waiting for data, the server might be unable to process other sockets, leading to potential latency issues.

Additionally, tracking the state of multiple connections, handling new connection requests, and closing connections gracefully is highly challenging. Improper handling can lead to resource leaks, security vulnerabilities, or denial-of-service attacks.

Yet further, switching between different sockets introduces context switching overhead, which can impact performance. Context switching involves saving and restoring the state of a thread, and frequent switches can degrade overall system performance.

Thus, systems and methods are needed to provide real time data to large numbers of clients at the same time, with very low latencies, and without disadvantages of the foregoing conventional techniques.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
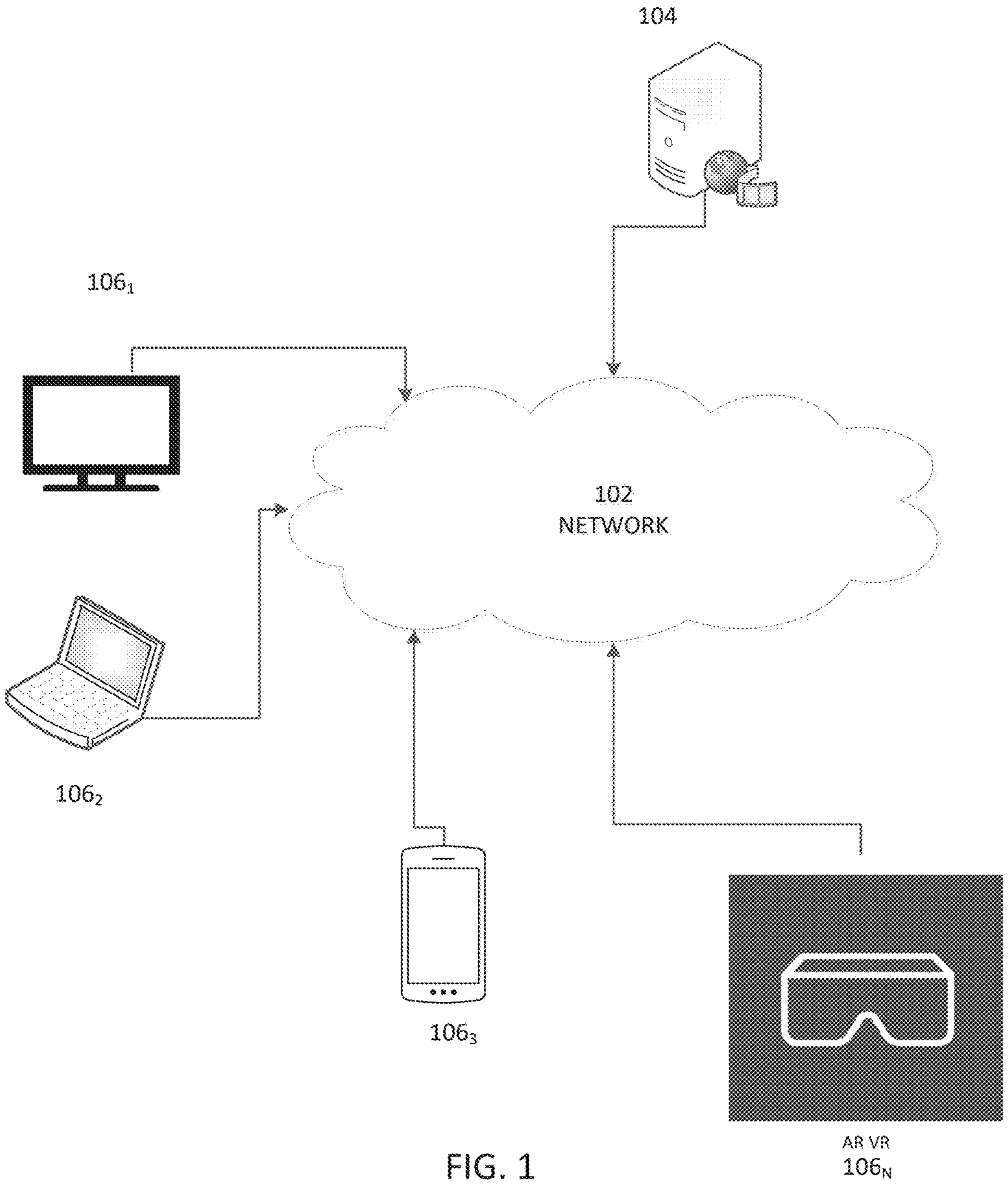
FIG. 1 illustrates an example networked environment architecture.

Systems and methods are described configured to provide real time, swiftly changing, dynamic data to large numbers of clients at the same time with low latencies.

Conventionally, when there is a high peak demand for rapidly changing data, an enormous load is placed on the computer systems (e.g., servers) providing such rapidly changing data. Conventional seat map generation systems are event driven where each individual state change of a seat is transmitted over a network to a user's browser as a message. Thus, by way of illustrative example, if an event venue has 20,000 seats, with 50,000 users attempting to obtain a ticket for the event, and if there is an average of 6 status changes per seat (e.g., available, reserved/placed in a user shopping cart, purchased, where a seat may be reserved/placed in a user shopping cart multiple times before a corresponding ticket is purchased), the number of messages that needs to be transmitted to user browsers=20,000×50,000×6=6 billion messages. If an event is very popular, there may be 150,000 users and 8 state changes, resulting in 20,000×150,000×8=24 billion messages.

Such peak loads often overwhelm the processors, memory, and network resources used to provide such rapidly changing data, resulting in significant latencies (e.g., 4-10 seconds or more). Such latencies may result in recipients of such data using what is stale, outdated data. The use of such stale data may result in erroneous decisions being made by recipients that assume the data is current. Further, the use of such stale data may result in user frustration and the abandonment of certain associated processes by the user.

By way of non-limiting example, for certain ticketed events the initial demand when the tickets go on sale online can be enormous, putting tremendous loads on ticketing servers and networks. In one recent instance, it was reported that 14 million users and bots hit a ticketing site at about the same time for a ticket onsale release. Users often want to select their seat for a ticketed event via a seating map provided by the ticketing site. The seating map may, for example, indicate seat status (e.g., via color, shading, and/or text), such as what seats are available, what seats are unavailable (e.g., already purchased or reserved), what seats are only available to certain users (e.g., those with the appropriate passcode), and seat prices. Updates to the seating map are typically conventionally made by transmitting JSON messages to user devices for each change in seat status. During high demand, millions of instances of seat map data may need to be served every minute, and hence the seat status presented via a seat map on a user computing device (e.g., via a browser) may not be updated quickly enough. Hence the seat map may depict certain seats as being available when they are no longer available. As a result, a user may select a seat via the seat map to purchase a corresponding seat ticket only to be informed by the ticketing site that the seat is no longer available. In addition, a seat map may depict certain seats as being unavailable when they have become available (e.g., as a result of a user abandoning a ticket purchase process).

In addition to user frustration, the initial ticket selection by the user will result in a ticket request being generated by the user client (e.g., a browser hosted on a user device), transmitted over a network to the ticketing server which processes the request and determines the seat is no longer available, and which then generates a corresponding message to the client which is transmitted over the network to the client, possibly in conjunction with an updated seat map with updated status. The message and the updated seat map, indicating the seat is no longer available, then needs to be rendered by the client. In addition, by the time the updated seat map is rendered by the client, it may already be outdated as a result of latencies. The user then needs to repeat the process of selecting a seat and requesting a corresponding seat ticket, and the process may repeat if the requested seat is no longer available. As a result, large amounts of client, network, and server resources are wasted in attempting to service requests for no-longer available seat tickets or other such resources.

Thus, the technical challenge of providing real time seat map data to large numbers of clients at the same time with low latency needs to be overcome.

In order to overcome the foregoing technical challenges, technical solutions are described herein.

An aspect of the present disclosure relates to using video streaming to broadcast a seating map reflecting status changes with respect to seat availability in substantially real time. In contrast to conventional approaches, which are API driven and which typically require a large number of calls (e.g., where each individual state change of a seat is transmitted over a network to a user's browser as a message), an optional aspect of the present disclosure relates to using a state-based process.

Advantageously, certain video streaming techniques enable images of seat maps to be delivered in real-time (e.g., in less than a second, and often at about 0.033 seconds or 0.017 seconds) to large numbers of clients by efficiently transmitting video (and optionally audio content) over the Internet. Certain example video streaming protocols that may be utilized to provide real-time updates to seat maps to clients will now be described.

Optionally, Real-Time Protocol (RTP) may be used in conjunction with RTMP (Real-Time Messaging Protocol) and RTSP (Real-Time Streaming Protocol) for real-time transmission of seat map data over IP networks to browsers or applications hosted on user devices. RTP is a network protocol that may be used for live streaming video (and audio) over Internet Protocol (IP) networks in real-time. RTP breaks the data into packets and adds timestamps and sequence numbers to respective packets. This enables the receiver to reconstruct the timing and sequence of the original data. RTP includes a header that contains metadata such as timestamps, sequence numbers, payload type, and synchronization information. RTP may carry the encoded data as payload. Video codecs such as AAC, MP3, H.264, and VP8 and others may be used to encode the seat maps for transmission via RTP. For example, a codec may be configured to compress into a container format image/video content to make file sizes smaller and storage and distribution of the videos utilize less network bandwidth. Optionally, a codec may be used to decompress a video file. Additionally, a codec may be configured to optimize video files for playback.

RTP may be encapsulated within RTMP for delivering real-time multimedia (e.g., seat map) content. This combination enables reliable transmission of multimedia data with low latency, making it suitable for live streaming applications.

RTSP is a network control protocol used for controlling the delivery of multimedia data over IP networks and may be used in conjunction with RTP for streaming video (and audio) content. RTSP establishes and controls media sessions between endpoints, while RTP is used for the actual transport of multimedia data. RTSP can initiate a session, control playback, and manage streaming sessions, while RTP handles the delivery of the video (and optionally audio) data.

By way of further example, HTTP Live Streaming (HLS) may be utilized to stream seat maps including updated seat maps as images in real time. HLS is an adaptive streaming protocol that breaks the video stream into small, downloadable segments and uses HTTP servers for content delivery. Clients (e.g., browsers or dedicated ticketing applications) may download and play the segments sequentially, enabling adaptive bitrate streaming, where the quality can be adjusted based on the client device's network conditions.

Dynamic Adaptive Streaming over HTTP (DASH) is another example protocol that may be utilized to stream seat maps as images, including updated seat maps in real time. Like HLS, DASH is an adaptive streaming protocol that segments video content into small chunks. DASH enables dynamic changes in the quality of the stream based on the viewer's network conditions. DASH may use HTTP servers for content delivery and is codec-agnostic, supporting various video and audio codecs.

On the backend of the ticketing system, a seat map may be generated (e.g., a single origin point), the generated seat map may be transmitted (e.g., as a camera view) to a broadcast point (e.g., a single broadcast point), which then broadcasts the seat map (e.g., as a camera view video file) to clients (e.g., browsers or dedicated ticket applications hosted on user devices) in real time using video streaming technology, such as by using the example streaming protocols described herein. The image of the seat map, including updates thereto, may optionally be transmitted at a fixed frame rate, such as 24 or 30 frames per second. Thus, when a client displays the seat map to a user, the indicated seat status is highly likely to be current. The user may then select a seat and request to purchase a ticket for the seat (a right to use the seat at the event). Because the requested seat will likely be still available, the purchase request can then likely be successfully processed, without having to reject the request and without having to repeat the process.

Optionally, the frame rate may be dynamically changed based at least in part on the frequency of changes in seat status. Optionally, updates and transmission of a seat map may be event driven, wherein seat map updates are generated and transmitted at least partially in response to a detected change in a seat status. Advantageously, such event driven encoding and transmission of seat maps as a video stream may greatly reduce the processing and memory utilization needed to generate seat maps and may greatly reduce the network bandwidth utilization for the transmission of seat maps (as a new message does not need to be transmitted for each seat whose status has changed).

Further, reproduction of the seat map as an image requires relatively less computer resources than conventional techniques. Thus, reproduction of the seat map may be performed using devices that have relatively less available computer resources, such as a wearable device or a vehicle entertainment system.

Optionally, more than one view (e.g., a "camera" view) of the seat map may be generated, and different sets of users may be provided different seat map views. For example, a first view (image) of a seat map for a given event may display seats that need a special passcode as being available (which may be transmitted to users that have entered the passcode), while a second view (image) of a seat map for the given event may display seats that need a special passcode as being unavailable (which may be transmitted to users that have not entered the passcode). By way of further example, one view of a seat map may be configured to display special offers (e.g., reduced price seats, free drinks with ticket purchase, VIP parking with ticket purchase, etc.), while another view of the seat map may not display the special offers. Thus, the different seat map views may act as filters.

Optionally, a seat map image may comprise a plurality of layers, where certain layers may correspond to respective special offers associated with a seat ticket purchase. For example, one layer may correspond to the seat map (showing available and unavailable seats), another layer may correspond to a VIP parking offer, and another layer may correspond to a free poster offer. A composite seat map image comprising two or more selected layers may be generated and transmitted to one or more user devices, where different layers may be selected for different users or sets of users.

By way of further example, a map may comprise a user interaction layer, a local state layer, a seat map layer, and/or a display map layer. The user interaction layer may be configured to manage interaction with the user (e.g., when the user hovers a pointer over seats, seating sections, and/or other elements of the map). The local state layer may be utilized to control which view of the map is displayed. By way of illustrative example, if a user zooms into a section (e.g., by clicking on the section, by activating a zoom control, by using a zoom finger gesture), then the local state layer may be utilized to only render that part of the state. The local state layer may optionally be utilized to keep track of seats that have changed state but where such state changes have not made it back to a seat inventory server. Thus, the local state layer may be utilized as a local state cache. The seat state map layer may interact with the local state layer to determine which portion of the seat state map should be in view on the user devices. Optionally, seat state map layer may be configured to update the seat map at a fixed (e.g., 30 or 60 frames per second) or dynamically controlled frame rate. The display map layer may be utilized to display static seat map data that do not change state (e.g., section names, seat rows, venue name, venue layout, venue building, and/or the like).

Optionally, each layer may be separately encoded using an encoder for transmission. For example, a layer may be encoded via an encoder using a JPEG or PNG image format. Optionally, the encoded layers may be individually transmitted over the network to user devices using a streaming protocol, such as RTP, HLS or DASH. Synchronization between the layers may be performed by the receiving user device to maintain the correct composition of the seat map image. The user device (e.g., via a web browser or dedicated ticketing application) may decode the received layers and to composite the layers into the final image. Advantageously, to reduce network bandwidth resolution and computer processing resources, if there are updates to a given layer (e.g., the seat map layer showing seat availability), optionally only that layer may be transmitted from the system to the user device, rather than transmitting all the layers, including those that have not changed.

An aspect of the present disclosure relates to the technical challenges presented by ticket bot. As networked computer resources have become ever more critical, there has been a commensurate rise in the use of automated programs (e.g., bots) to improperly access such networked computer resources, such as event tickets. For example, when tickets for a popular event go on sale, large numbers of bots may make rapid ticket requests via a seating map, overloading the ticketing system and enabling the bot operator to obtain tickets for resale, thereby preventing legitimate human users from purchasing tickets during the on sale.

Conventional attempts to solve the technical and other challenges presented by automated programs improperly accessing such networked computer resources have not provided satisfactory solutions.

For example, conventionally, websites may utilize CAPTCHA (Completely Automated Public Turing test to tell Computers and Humans Apart), a type of security measure known as challenge-response authentication, to attempt to prevent a bot from accessing a website service. However, CAPTCHA can be time consuming and challenging for humans. In addition, more sophisticated automated programs are configured with artificial intelligence functionality which enables them to successfully respond to the CAPTCHA challenge.

In contrast, certain techniques described herein overcome the technical challenges presented by bots, without the drawbacks of conventional approaches and without burdening legitimate users.

A variety of techniques may be used to detect bots. For example, user sessions with the ticketing system may be analyzed for unusual patterns, such as rapid and repetitive requests. By contrast, legitimate users typically exhibit more varied and human-like behavior during the ticket purchasing process. By way of further example, user interactions may be monitored (e.g., mouse movements, clicks, and/or navigation patterns), and patterns associated with automated scripts may be detected. This may involve analyzing mouse movements, clicks, and navigation patterns to identify anomalies. By way of further example, sudden spikes in traffic or abnormal purchasing patterns, which may be indicative of bot activity, may be detected.

Once suspected bot activity has been detected, the suspected bot activity may be scored, and if the score exceeds a corresponding threshold, the source of the activities may be classified as a bot.

In order to slow down the bots and prevent or inhibit the bot from successfully acquiring tickets (especially for events for which large numbers of user ticket requests are received), updates to seat maps transmitted to the detected bot source may be slowed so as introduce significant update latencies (e.g., 3-10 seconds) and/or the frame rate of the seat map images to the bot source may be reduced (e.g., to one-third (e.g., 10 Hz) or less of the frame rate for legitimate user devices (e.g., 30 Hz)). Thus, for many events, and in particular, for very popular events, by the time the bot selects a seat on an already outdated seat map in order to purchase a ticket for the selected seat, the seat ticket may have already been sold to a legitimate user and hence the bot's attempted to purchase the ticketed will be denied. Furthermore, because the use of ticketing bots will be unsuccessful, the use of such bots may decrease, hence reducing the load on the ticketing system and on network resources. Because the load on the ticketing system and on network resources is reduced, the corresponding size of the computer and network infrastructure may be reduced.

Another aspect of the present disclosure relates to generating a video (e.g., using a video codec, such as H.264, VP8, VP9, H.265, or as an MP4, MOV, AVI, WMV, AVCHD, WebM, FLV, or other video file format, which may be streamed by RTP or other protocol as a payload) of the dynamic changes to an event seat map and to transmitting the video as a video file to one or more destinations, such as the venue operator, the performer, and/or other destination. The video may be played back on a video player hosted on a computer system, wherein a user or video analysis application may play, rewind, and/or fast forward to view changes in seat status.

Optionally, respective video frames may be time stamped and/or stamped with a sequence indicator so that a viewer can view changes in seat status at specific times and can view changes over time. Optionally, related data from one or more sources may be provided and synchronized with the seat map video. Such related data may include information on how many tickets are in user carts, how many tickets have been sold, how many ticket purchases have been abandoned prior to completion, and/or the like. Thus, for example, a viewer may view a seating chart on a frame by frame basis if desired, wherein the status of each seat may be displayed via a given frame in conjunction with some or all of the related data corresponding to the frame. Similarly, the viewer may fast forward through, rewind through or skip to a desired location of the seat map video (e.g., using a scrubber control, a fast forward control, a rewinder control, or the like). As noted above, the related data may be synchronized with the seat map using time stamps and/or sequence indicators, wherein a given item of related data may be displayed together with a corresponding frame of the seat map video.

Certain aspects will now be described with reference to the figures.

Referring now to FIG. 1, an example networked architecture and associated processes are illustrated. The illustrated networked architecture comprises a resource allocation system 104 (e.g., a ticketing system) and a plurality of user devices $\mathbf{106}_1$, $\mathbf{106}_2$, $\mathbf{106}_3$ . . . $\mathbf{106}_n$ coupled to the resource allocation system 104 via one or more networks 102 (e.g., the Internet).

The user devices may comprise various types of networked computing devices, such as desktop computers, networked televisions, streaming set top boxes or dedicated streaming devices, networked game consoles, vehicle entertainment systems, or mobile devices (e.g., laptop computers, smartphones, tablet computers, augmented reality headsets, virtual reality headsets, smart watches, other wearables, vehicle entertainment systems, and/or the like). A user device may include a network interface (e.g., a wired or wireless network interface, such as a cellular modem, a Wi-Fi interface, a BLUETOOTH interface, an ethernet interface and/or the like), user input devices (e.g., touch screen, touch pad, keyboard, microphone, mouse, camera, and/or the like), and/or output devices (display, speaker, haptic device, and/or the like). The user device network interface may enable the user device to communicate over the network 102 with the resource allocation system 104.

By way of example, the resource allocation system 104 may include one or more servers. The resource allocation system 104 may optionally comprise a cloud-based system including a hosted computing environment that includes a collection of physical computing resources that may be remotely accessible and may be rapidly provisioned as needed. Further, the resource allocation system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all the data, programs, and/or content described herein. Some or all of the data stored therein may be encrypted. The various systems/devices may communicate with each other over one or more networks, such as the Internet, other wide area, local area, or other networks.

The resource allocation system 104 may comprise a ticketing service that sells or otherwise provides tickets to ticketed events (e.g., sporting events, concerts, movies, shows, museums, conventions, and/or the like). The ticketed events may be associated with reserved seats at a venue. Thus, a ticket may grant a ticket acquirer with a right of entry to an event and optionally a right to a specific seat (or set of seats) at an event. For example, a given venue seat may be associated with a unique seat identifier (e.g., a seat number, seat row, and seating section)

Certain seats may be more preferred than other seats at an event. For example, certain seats may be closer to and/or have a better view of a performing area (e.g., a stage or field). As a reflection of which seats are generally preferred seats, certain seat tickets may be more expensive than other seat tickets for a given event. In addition, certain event seat tickets may only be available (e.g., for a period of time) to those with a specific code or credit card.

The resource allocation system 104 may maintain a database that stores information about the venue, including the seating layout, individual seat details/identifiers (such as seat number, row, section), the ticket price for a given seat or set of seats, and/or the current status of a given seat (e.g., available, reserved (e.g., in someone's shopping cart), sold, unavailable, etc.).

The resource allocation system 104 may generate (e.g., using the information from the database, a venue data source, and/or other data sources) a seat map for a given event. The seat map may indicate a venue seating layout (e.g., stage location, seating section locations and identifiers, aisles, seat rows (and associated seat row identifiers) within seating sections, and/or individual seats (and associated seat identifiers). In addition, the seat map may indicate the status of respective seats. For example, the seat map may visually indicate which seats are available to purchase tickets for, which seat tickets are first sale tickets, which seat tickets are resale tickets, which seats are no longer available, which seats are only available to certain users (e.g., those with specific access codes or credit cards), seat prices, and/or other seat-related data. For example, a circle or other symbol may be used to represent a seat. Seat status information may be indicated using colors, shapes, bolding, and/or text. For example, the seat symbol may be filled to indicate that the seat is available and may be unfilled to indicate that the seat is unavailable. By way of further example, color coding may be used to indicate if a seat is available or unavailable. By way of yet further example, a first shape may be used to indicate that a seat is available, and a second shape may be used to indicate that a seat is unavailable. Thus, when a user selects a seat that is represented as available, the representation may be changed to indicate that the seat is unavailable to other users.

The resource allocation system 104 database may be constantly updated in real time as seats are placed on hold/reserved (e.g., in response to a user adding a ticket to an electronic shopping cart, while a user purchase information is being processed, etc.), released (e.g., as a result of a purchase processing failing to complete or a user deleting a seat ticket from their electronic shopping card), booked as a result of a ticket sale, or otherwise becomes unavailable.

The resource allocation system 104 may host a web application or website that users interact with (e.g., via a web browser or a ticketing application hosted on respective user devices) to browse through events, view seat maps, select seats (e.g., via the seat map) and purchase tickets. The web application communicates with the database to retrieve real-time information about seat availability. The user device browser may display the video seat map (e.g., received as an image in a video stream using RTP, HLS, DASH, HTML5 or otherwise. Optionally, the video seat map may be hosted by the resource allocation system 104 and the video seat map may be embedded using an <iframe> element that points to the video seat map on the hosting platform.

A user can interact with the seat map by selecting seats on the seat map (e.g., using a pointing device, such as a mouse, trackpad, finger, stylus, or voice command), viewing seat details, and proceeding to the checkout process to purchase tickets for the selected seats. The seat map graphics may represent different sections, rows, and individual seats, as well as the placement of the performance area (e.g., a stage, playing field, etc.). As discussed elsewhere herein, colors, symbols, visual effects, and/or text may be used on the seat map to indicate the status of each seat (e.g., available, reserved, sold, only available to those with an access code, etc.).

As discussed elsewhere herein, in contrast to conventional techniques for providing seat maps, certain video streaming techniques, such as RTP or the HLS or DASH protocols, may be utilized to enable video images of seat maps, and updates thereto, to be efficiently streamed via a streaming server over the Internet or other network in real-time to large numbers of clients as frames. Optionally, the streaming server may stream the seat map updates to user devices via one or more content delivery networks.

A Content Delivery Network (CDN) may have servers distributed across various geographic locations. When a user browser or application on a user device requests a seat map stream, the CDN may select the server closest to the user device to deliver the content. This minimizes latency and ensures faster delivery of seat map video content by reducing the distance data needs to travel. The CDNs may enable Adaptive Bitrate Streaming (ABR) techniques. With ABR, the video player dynamically adjusts the quality of the video stream based on the viewer's available bandwidth and device capabilities. The CDNs may deliver multiple versions of the video at different bitrates, and the video player selects the appropriate version in real-time. This ensures a smooth viewing experience even in varying network conditions.

A codec, (e.g., a H.264, VP8, VP9, or H.265 codec) may be used by the resource allocation system 104 to encode the seat map for the video stream. Optionally, the seat map may be encoded into different quality levels enabling the client (e.g., a web browser or dedicated ticketing application) on the user's device to dynamically adjust the quality of the video playback of the seat map based on the network conditions.

Once a user selects one or more seats, the resource allocation system 104 may receive the selection and verify that the seat tickets are still available. If the tickets are still available, the resource allocation system 104 enables the user to proceed to a checkout process to purchase the tickets for the selected seats. The resource allocation system 104 may optionally communicate with a payment system to process the transaction. If the purchase process is successful completed, the resource allocation system 104 may update the resource allocation system 104 database to reflect the new status of "unavailable" of the purchased seats. In addition, a user record associated with the user may be updated to associate the user with the ticket. The resource allocation system 104 may encode and transmit (as a video stream) an updated version of the seat map, with the seat representations of the seats for which the tickets were purchased changed to show the seats are now unavailable.

Figure 2A:
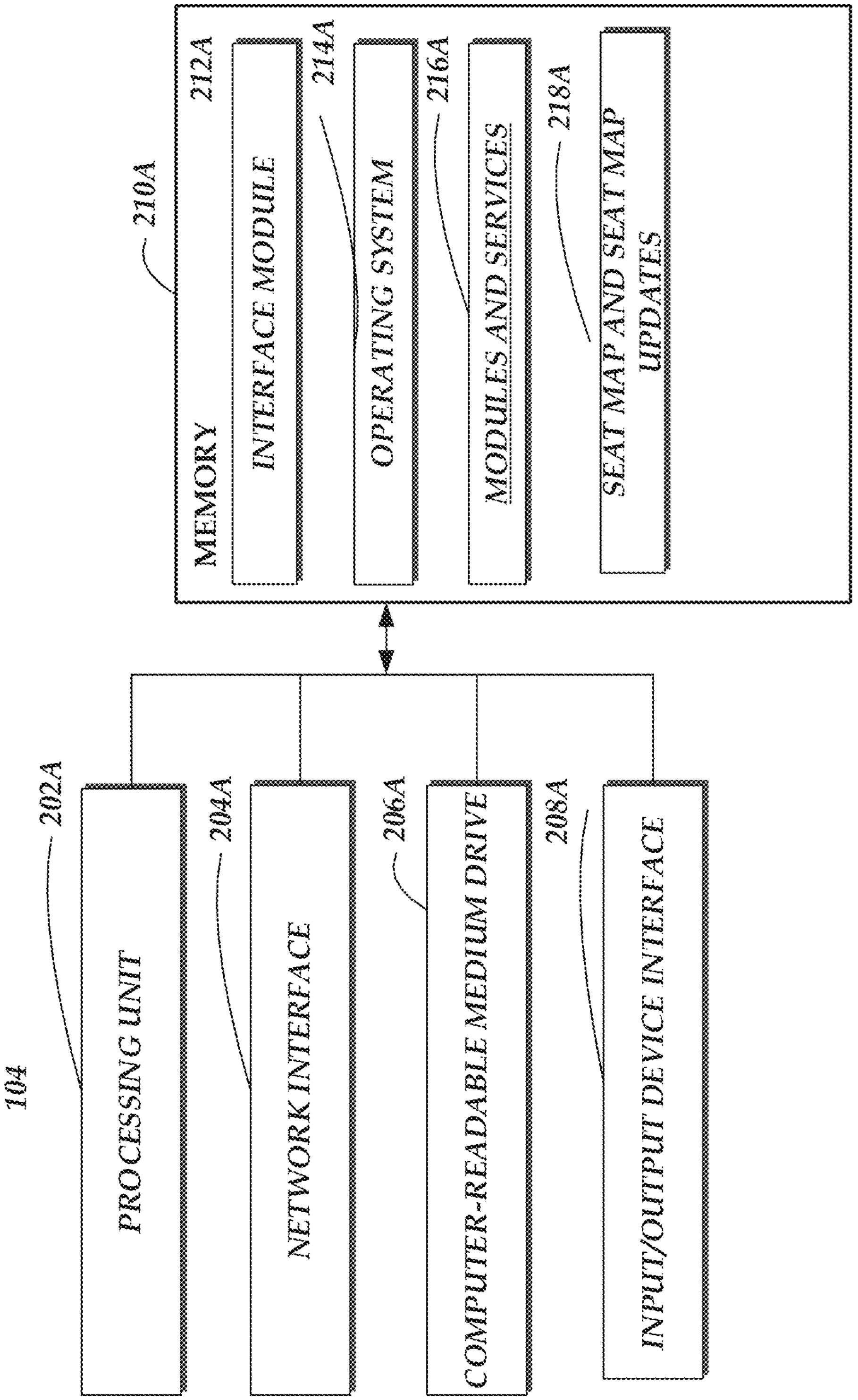
FIGS. 2A-2B illustrates an example system architecture.

FIG. 2A is a block diagram illustrating example components of the resource allocation system 104. The example resource allocation system 104 includes an arrangement of computer hardware and software components that may be used to implement aspects of the present disclosure. Those skilled in the art will appreciate that the example components may include more (or fewer) components than those depicted in FIG. 2A. The resource allocation system 104 may comprise a cloud-based computer system as similarly discussed elsewhere herein.

The resource allocation system 104 may include one or more processing units 202A (e.g., a general purpose or other processor (e.g., comprising one or more arithmetic logic units, data registers, an encryption processor, a video transcoder, input/output busses, and/or a high speed graphics processor), one or more network interfaces 204A, a non-transitory computer-readable medium drive 206A, and an input/output device interface 208A, all of which may communicate with one another by way of one or more communication buses. The network interface 204A may provide services described herein with connectivity to one or more networks or computing systems (e.g., venue systems, user devices, event promoter systems, seat map visualization systems, etc.). The processing unit 202A may thus receive communications (e.g., ticket service requests, verification/authentication requests and data, etc.) and instructions from other computing devices, systems, or services via a network, and may provide responsive data and/or execute instructions. The processing unit 202A may also communicate to and from memory 210A and further provide output information via the input/output device interface 208A. The input/output device interface 208A may also accept input from one or more input devices, such as a keyboard, mouse, digital pen, touch screen, touch pad, microphone, camera, etc.

The memory 210A may contain computer program instructions that the processing unit 202A may execute in order to implement one or more aspects of the present disclosure. The memory 210A generally includes RAM, ROM (and variants thereof, such as EEPROM) and/or other persistent or non-transitory computer-readable storage media. The memory 210A may store an operating system 214A that provides computer program instructions for use by the processing unit 202A in the general administration and operation of modules 216A, including its components.

The memory 210A may store user accounts, including for a given user a user name, a user email address, a user phone number/SMS/text messaging address, other electronic destinations, geographical information (e.g., physical address, zip code, city, etc.) a unique user identifier (e.g., an alphanumeric identifier, biometric data (e.g., fingerprint data, face print data, iris print data), and/or the like), a unique user device identifier (e.g., a cell phone unique identifier), event identifiers corresponding to events the user has access rights to, hashes of user device and/or user identifiers, user preferences (e.g., favorite performers, favorite venues, favorite musical styles, other preferences discussed herein, and/or the like), payment instrument data, and/or other user data described herein. The memory 210A may store in a user record access rights (e.g., event tickets) owned by the user (e.g., purchased by or transferred to the user).

Optionally, a user may present a user device (e.g., a smart phone) at a venue for a ticketed event. A ticketing application on the user device may generate a code (e.g., an optical code) which may comprise a hash of one or more unique identifiers (e.g., a user ID and/or a user device ID). The code may be read by a reader at the venue and the hashed code(s) and optionally a time stamp, the hashed value may be compared with corresponding hashed identifiers stored in the database in association with user accounts, and the time stamp may be compared with a current time. If the time stamp varies from a current time by more than a threshold amount, the user may not be granted access to the ticketed event. If the time stamp does not vary from a current time by more than a threshold amount and if a match is found, a determination may be made as to whether the user account is associated with one or more tickets for the ticketed event. If the user account is associated with one or more tickets for the ticketed event, a signal may be transmitted to an indicator device in proximity to the reader that indicates that the user is granted access to the ticketed event at the venue. The indicator device (e.g., a display, light, and/or sound) may visually and/or audibly provide an indication that the user is granted access to the ticketed event at the venue. Otherwise, a denial signal may be transmitted to the indicator device, which may in turn indicate visually and/or audibly that the user is to be denied access to the ticketed event at the venue. Optionally, in addition or instead, an electronic and/or physical ticket may be provided to the user which may be utilized to access the event and utilize a specific seat.

The memory 210A may store may also store event, seat map, access token (e.g., ticketing), venue information, and/or videos of seat maps indicating changes in seat status such as discussed elsewhere herein. For example, the seat maps of multiple events at multiple venues and a video history of status changes thereto 218A may be stored in memory 210A. Such history of status changes to seat maps (e.g., reflecting when seat status changed from available to reserved, from reserved to sold, from reserved to freed, etc.) may be used to generate a navigable video of seat map status changes, via which a viewer may rewind, fast forward, pause, and advance on a frame-by-frame basis, the video and/or may jump to a desired location. For example, the video player used to playback the seat map video may comprise rewind, fast forward, frame advance, and pause controls (e.g., separate discrete controls and/or a scrubber). Such navigable video of seat map status changes may be time stamped and/or sequence stamped so that it can be determined when in a given on sale a given seat status changed. Optionally, unique ticket identifiers (e.g., an alphanumeric and/or optical code) may be stored in memory, where the ticket identifiers may correspond to physical or electronic tickets issued to a user.

In an example embodiment, the memory 210A includes an interface module 212A. The interface module 212A can be configured to facilitate generating one or more interfaces through which a compatible computing device may send to, or receive from, the modules and services 216A.

Figure 2B:
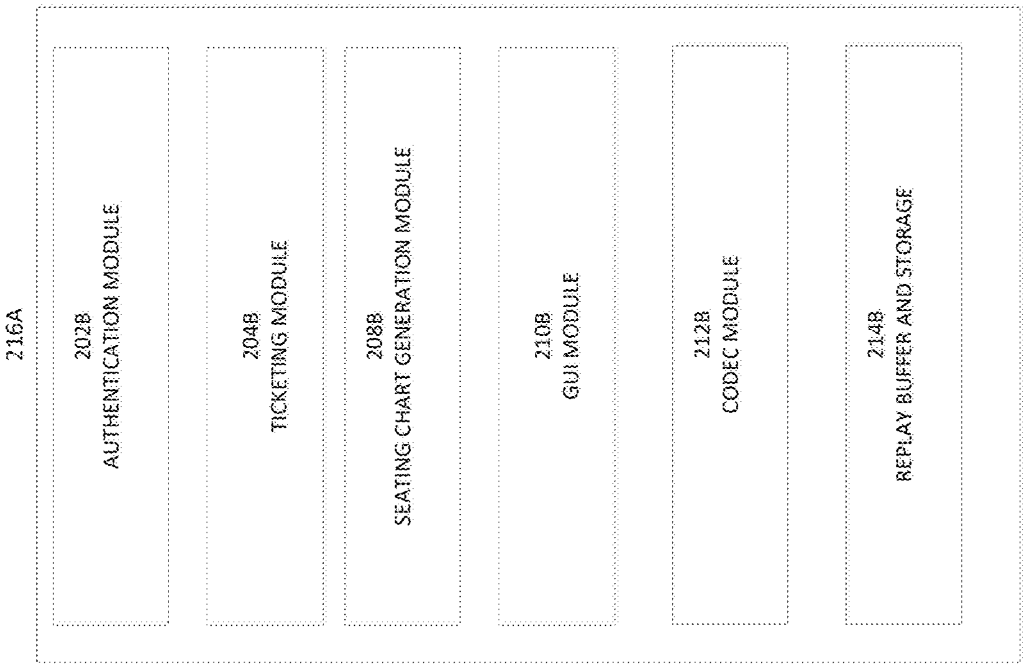

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor, a graphics processor, and a video codec. The system 104 may offload certain compute-intensive portions of the modules and services 216A (e.g., transcoding and/or transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, such as the HLS or DASH protocols.

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Some or all of the data and content discussed herein may optionally be stored in a relational database, an SQL database, a NOSQL database, or other database type. Optionally, the memory 210A may include one or more third party cloud-based storage systems.

The modules and services 216A may include a GUI module 210B that generates and/or populates graphical user interfaces and processes user inputs, and a search component (which may include a search engine used to search for ticketed events). The modules and services 216A may also include an authentication module 202B configured to perform identifier authentication in order to determine if a user is a human or an automated program (e.g., a ticketing bot). The authentication module 202B may be configured to enable a user to log into or otherwise access a ticketing account (e.g., using a user identifier, a password, a passkey, a device identifier, and/or a biometric input such as a face or fingerprint). Optionally, the authentication module 202B may be configured to perform multifactor authentication.

A ticketing module 204B may be configured to enable users to view information regarding ticketed events, view access token (e.g., ticket) prices, create a user account (optionally including some or all of the user account information discussed herein), purchase or otherwise obtain one or more access rights (e.g., access tokens, such as tickets) to the event, store an indication of access rights obtained by the user (e.g., purchased by the user, transferred to the user, lent to the user), store an indication of access rights transferred by the user to another person, and/or recommend events to the user (e.g., using the user's preferences, access token acquisition history, geographical location, event sponsorship, and/or the like).

A seat map generation module 208B is configured to access event venue seat maps, populate the seat map to indicate available and unavailable event venue seats, indicate seating prices, indicate if certain codes or credit cards are needed to purchase a ticket for a seat, access images of a view from a given seat, whether the ticket for the seat is a first sale ticket or a resale ticket, and the like, and generate an image of the seat map. As similarly discussed elsewhere herein, the seat map generation module 208B may update the seat map in real time and may cause the updated seat map to be transmitted as an image in a stream in real time to user devices (e.g., large numbers of user devices, such as thousands or tens of thousands of user devices), optionally via the ticketing module 204B. For example, the seat map generation module 208B may utilize the codec module 212B to stream the updated seat map to user devices in real time as images in a video stream (e.g., using the HLS or DASH protocols) as similarly described elsewhere herein. The codec module 212B may optionally comprise an H.264, H.265, HEVC, VP8, VP9, AV1, and/or other codec. The codec module may be configured to generate MKV, AVCHD, MP4, WebM and/or other video formats.

Replay buffer and storage 214B optionally manages frame buffering to smooth out jitter and other timing variations between frames. In addition, the replay buffer and storage 214B may enable the replay of the seating chart video stream as described elsewhere herein.

Figure 2C:
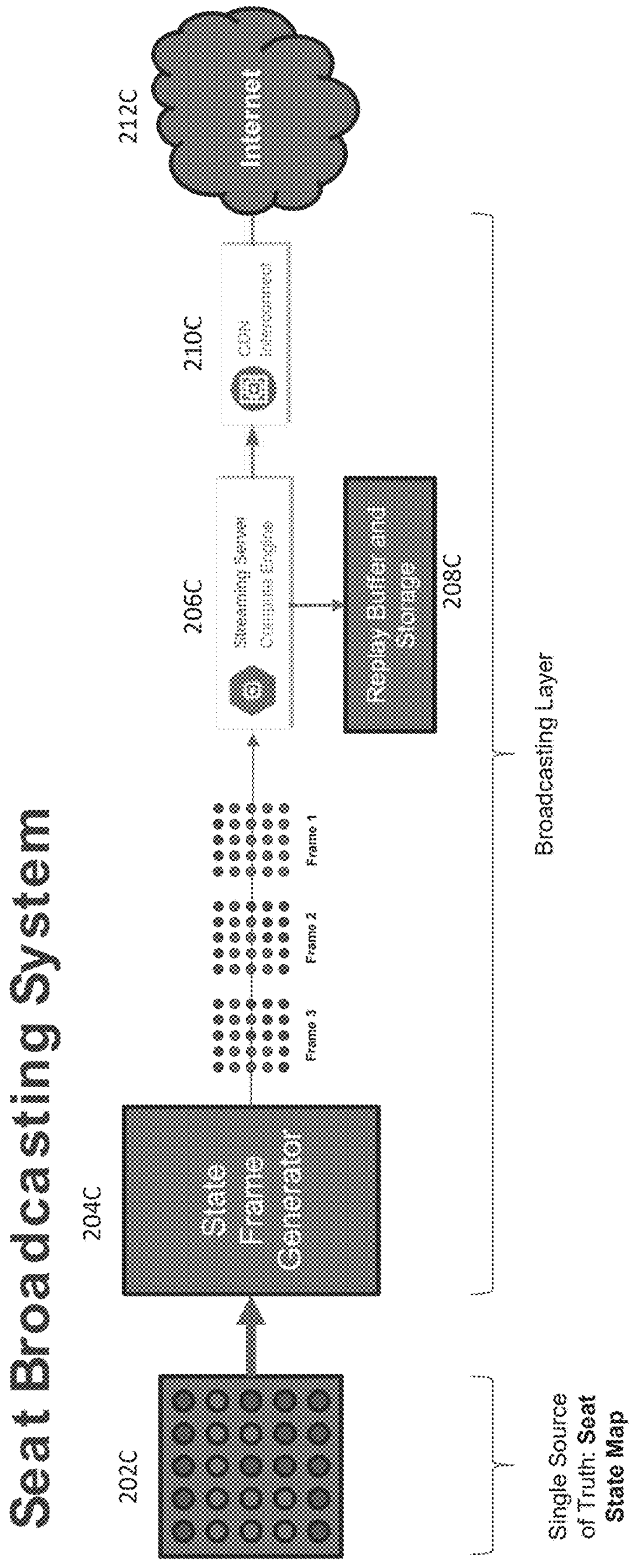
FIGS. 2C-2F illustrate an example seat broadcasting system architecture, receiver and data flow.

FIG. 2C illustrates an example seat broadcasting system architecture and data flow. A seat state map source 202C (e.g., one or more seat ticket inventory sources) provides a seat state map comprising the state of seats in a seat map (e.g., available/on sale, not available, sold, on hold/in shopping cart, etc.) is provided to a state frame generator 204C. As described in greater detail herein, the state frame generator 204C captures stream state changes for seats in a seat map (e.g., from inventory servers) and provides segmentation, filtering, view shaping, frame generation, frame buffering, and stream generation (e.g., using RTP and/or other streaming protocols such as those described herein). The stream generation comprises frames, wherein a given frame (e.g., Frame 1, Frame 2, Frame 3) indicates the current state (e.g., available/on sale, not available, sold, on hold/in shopping cart, etc.) of all or a subset of seats in the seat map. A streaming service 206C generates a stream of seat map status frames using one or more streaming protocols. The stream may be transmitted to one or more CDNs 210C, which may in turn relay the stream via a network 212C (e.g., the Internet) to one or more receivers (e.g., client devices hosting browsers or ticketing applications). A replay buffer and storage 208C may provide frame capture, transaction feeds, aggregation, and/or notifications as described elsewhere herein.

Figure 2D:
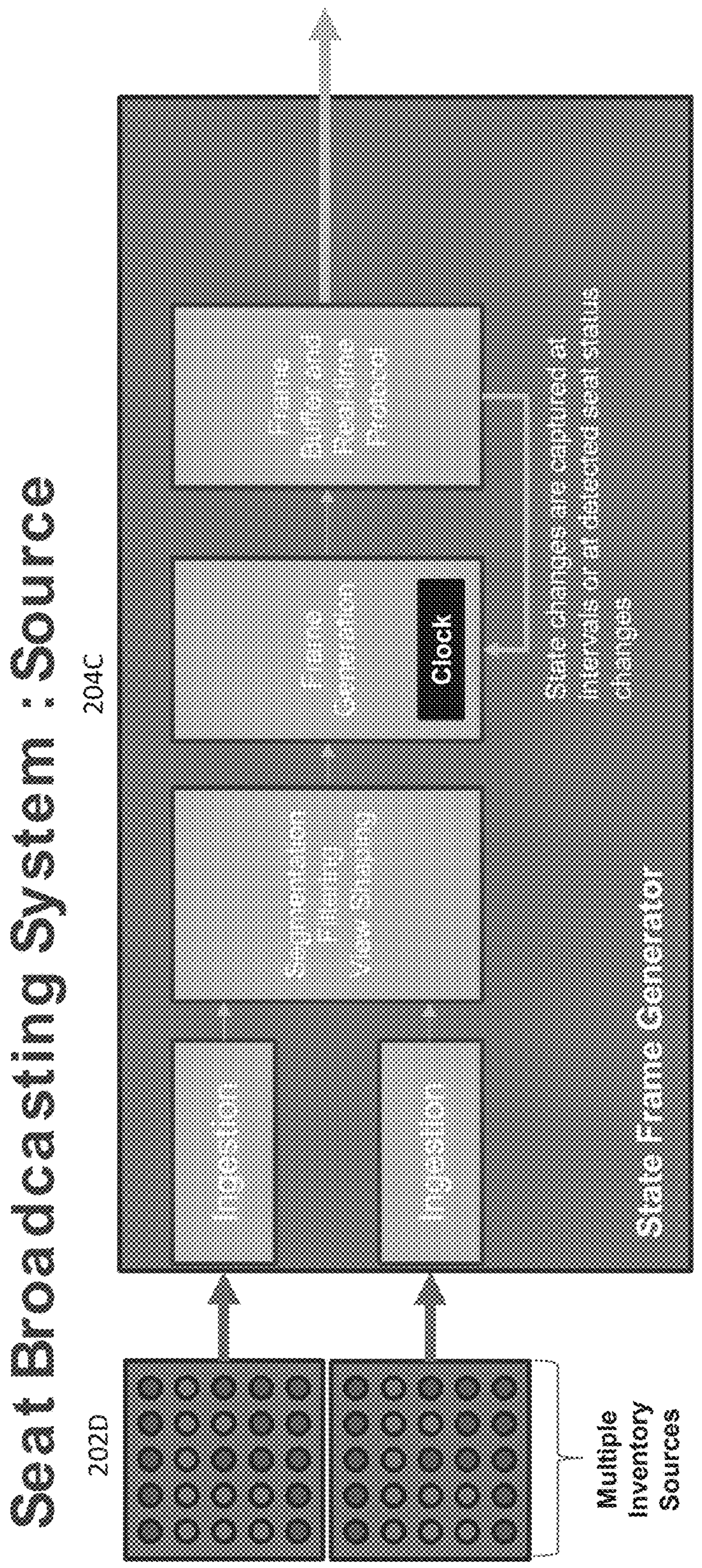

FIG. 2D illustrates the example seat frame generator 204C in greater detail. The state frame generator 204C ingests seat status data from one or more inventory sources 202D (e.g., first sale inventory source, a ticket resale source, and/or other sources) to thereby capture stream state changes. The seat frame generator 204C updates in real time an internal state of the map per inventory source per event.

The seat frame generator 204C may comprise one or more mechanisms for controlling the display of set map related data, such as segmentation, filtering, and/or view shaping. The segmentation mechanism segments state changes into events that are actively running real-time seat maps from which seats may be selected by users. The filtering mechanism may be configured to mask seat state changes that are not currently available to the public and/or are held back (hold state) for later sale to the public. The view shaping mechanism enables a seat status for a given seat to be displayed on multiple different seat maps. Thus, the view shaping mechanism is configured to map a seat state to multiple display maps.

A frame generator may capture a given frame of the seat state in the format needed by the displayed seat map. Optionally, a feedback loop provides throttling and buffer control to maintain a specified frame rate stream. A frame buffer may be utilized to perform frame buffering to smooth out jitter and other timing variations between frames. Optionally, the feedback loop and frame buffering may be utilized for the navigable video of seat map status changes (e.g., via which a viewer may rewind, fast forward and pause the video of the seat map depicting seat status change or just to a desired frame using a scrubber or other such control) and not used with respect to providing a seat map to ticket purchasers. This is because ticket purchasers generally just need the very latest map with the most current status and are not concerned as to whether a given earlier frame (which may be outdated and contain stale data) has been dropped and are not concerned with jitter issues.

The frame generator may be configured to use a real time protocol (e.g., RTP adapted with RTMP and RTSP) to provide real time streaming of the seat map as similarly discussed elsewhere herein. Such real time protocol may use timing information from the stream server to maintain lossless or near lossless frame delivery with little or minimal jitter.

Figure 2E:
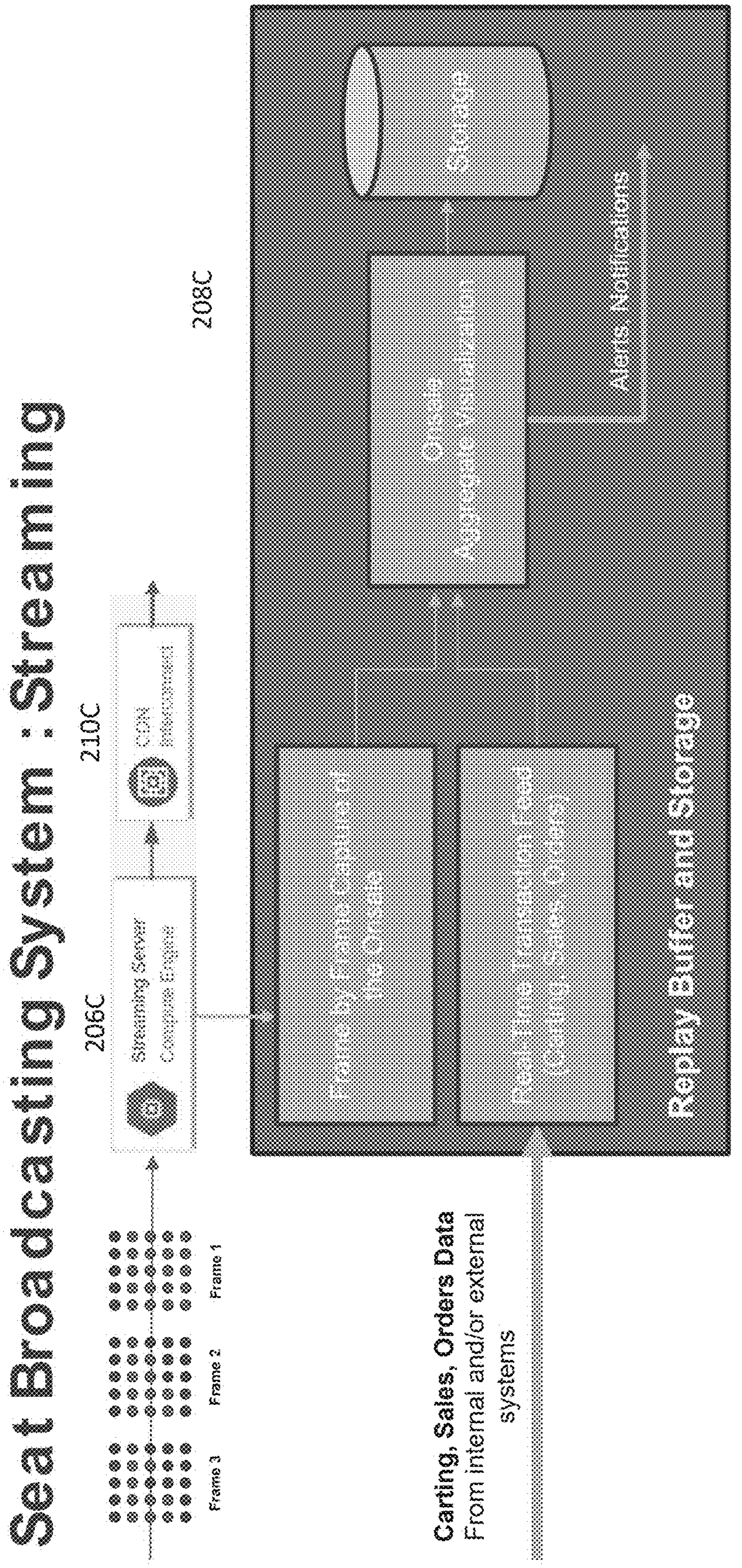

FIG. 2E illustrates the example streaming flow and replay buffer and storage 208C in greater detail. Seat map frames (comprising updated seat status) may be received by the streaming server 206C and may then be distributed to end user devices via one or more CDNs 210C as similarly discussed above. In addition, the replay buffer and storage 208C captures the actual broadcast frames. A given broadcast frame carries a master timestamp and/or other sequence or synchronization indicator that is used to synchronize with other data streams. In addition, the replay buffer and storage 208C receive real time transaction feeds occurring during seat ticket sales for a given ticketed event. Such transaction feeds may include an identification of ticket orders placed, seats tickets added to electronic shopping carts, seat tickets payments, seat ticket sales, and/or the like. A given transaction may carry a master timestamp or other sequence/synchronnization indicator that may be used to synchronize the transaction with frames captured via the frame capture.

An aggregator may be configured to synchronize the frames with transactions in the in the feeds (e.g., using the timestamp or other synchronization/sequence marker) to thereby generate a streamable, playable, navigable (e.g., configured to be rewound, fast forwarded, and paused) video "movie" reflective of changes in seat status and including corresponding synchronized data to provide a viewer with a much more complete picture of the ticket onsale process. The movie may be stored in memory for later access and/or may be streamed to one or more destinations (e.g., viewer devices hosting a player) for analysis. A viewer is enabled to review, via the player, the movie at any desired timestamp or other location, at a specified playback speed (e.g., real-time, 2×, 4×, 16×, 32×, etc.), and may rewind, fast forward or pause the playback.

The aggregator is optionally configured to generate one or more types of notifications based at least in part on detection of certain conditions in the seat map video movie, the received frames, and/or the transaction feeds. The notifications may be transmitted (e.g., via email, text message, browser or other application) to one or more destinations. For example, the conditions may relate to a detected potential fault condition, and the notification may be configured to trigger a fault and verification process. Example potential fault condition may include the detection of no seat status changes within a threshold amount of time, the detection of no seat added to electronic shopping carts within a threshold amount of time, the detection of the failure of more than a threshold number of ticket payment processing failures within a threshold period of time, and/or the like.

Figure 2F:
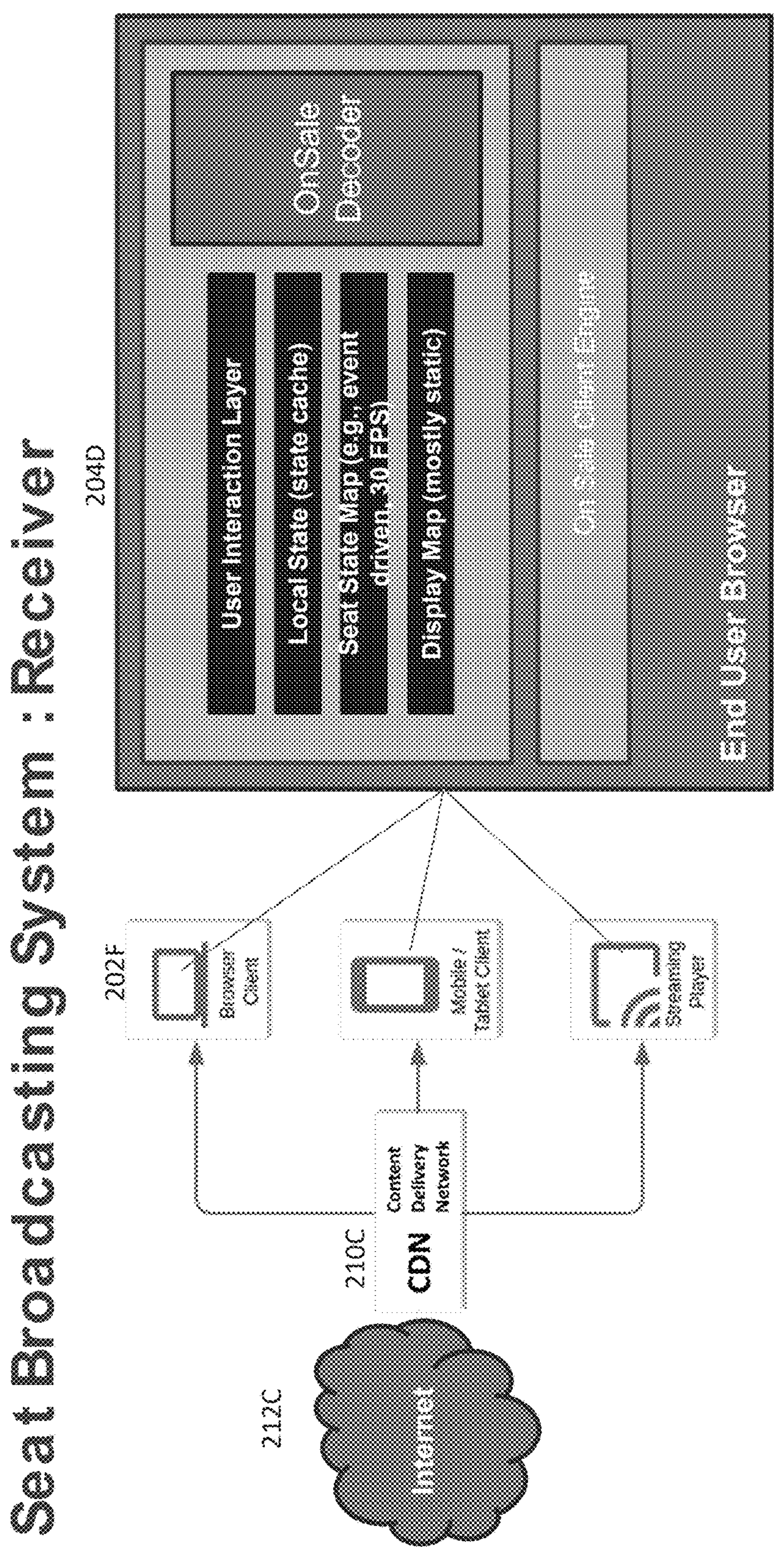

FIG. 2F illustrates an example streaming seat map receiver 202F (e.g., a user device such as a video streaming player, personal computer, a laptop computer, a tablet computer, a smart phone, a wearable computer, and/or the like). For example, the receiver 202F may comprise a browser 204D. The receiver 202F may receive streaming content via a CDN 210C which in turn may receive the streaming content over the network 212C.

The browser may comprise/execute a video decoder configured to decode and decompress an incoming video stream (e.g., the seat map video stream). The client may maintain a connection to the video stream during an active ticketed event onsale.

The video decoder may be configured to enable map frames to be displayed using multiple overlay layers described herein. For example, an onsale steaming map may comprise a user interaction layer, a local state layer, a seat map layer, and/or a display map layer.

The user interaction layer may be configured to manage interaction with the user (e.g., in response to the user hovering a pointer over seats, seating sections, and/or other elements of the map). The local state layer may be utilized to control which view of the map is displayed. By way of illustrative example, if a user zooms into a section (e.g., by clicking on the section, by activating a zoom control, by using a zoom finger gesture), then the local state layer may be utilized to only render that part of the state. The local state layer may optionally be utilized to keep track of seats that have changed state but where such state changes have not made it back to a seat inventory server. Thus, the local state layer may be utilized as a local state cache. The seat state map layer may interact with the local state layer to determine which portion of the seat state map should be in view on the user devices. Optionally, the seat state map layer may update the seat map at a fixed (e.g., 30 or 60 frames per second) or dynamically controlled frame rate. The display map layer may be utilized to display static onsale seat map data that do not change state (e.g., section names, seat rows, venue name, venue layout, venue building, and/or the like).

An onsale client engine may be configured to handle carting (e.g., the adding of a seat ticket to an electronic cart), event selection for ticketed events, ticket quantity selection, shopping cart checkout, and seat ticket payment processing.

Figure 3:
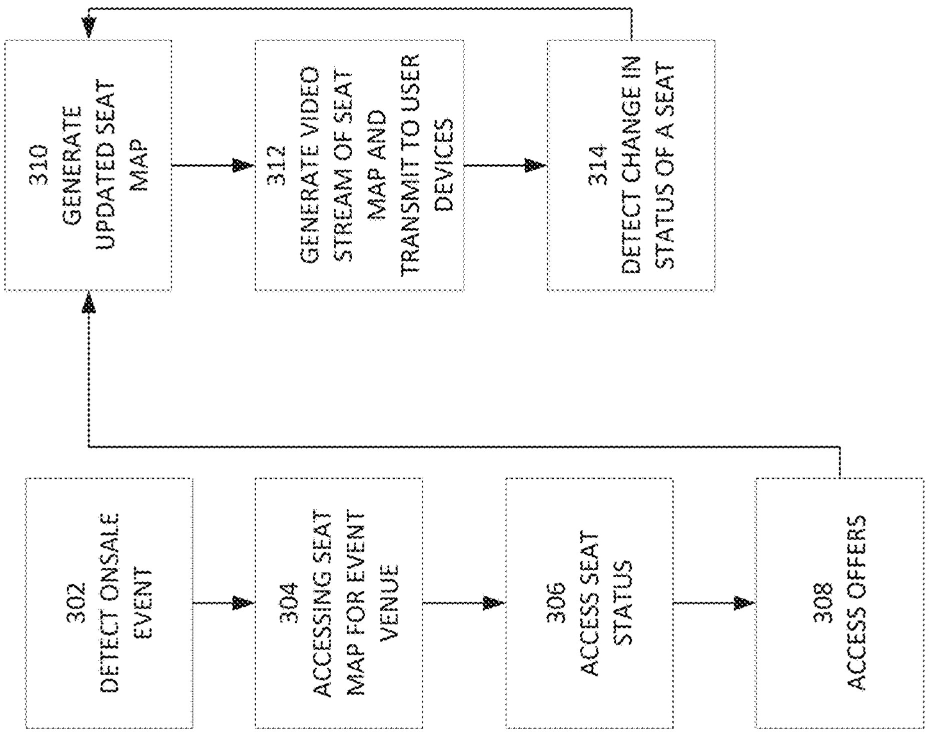
FIGS. 3, 4, and 5 illustrate example processes.

FIG. 3 illustrates an example process. The process may be executed using one or more systems disclosed herein (e.g., a resource allocation system, a user device, and/or a venue system).

At block 302, an initiation of an event ticket sale (sometimes referred to herein as an "onsale") is detected. For example, the initiation of the event ticket sale may be triggered by a calendar entry specifying the date and time of the beginning of the ticket sale for the event. By way of further example, a user may manually trigger the start of the event ticket sale.

At block 304, a seat map may be accessed from a data store for the event for the event venue. The seat map may include section identifiers, row identifiers, and/or seat identifiers (wherein one or more of the foregoing may be used to uniquely identify a seat), and a layout of seats that reflect the physical location of the seats at the event venue. The seat map may also depict the location and shape of a performance area (e.g., a stage or playing field).

At block 306, seat status data may be accessed from the data store. The seat status data may include seat availability status (e.g., available, unavailable, reserved, etc.), seat ticket prices, special offers (e.g., associated with specified seats, seats of seats, and/or users), and/or restrictions on access to respective seat tickets. For example, certain seats may only be available to certain users, such as those with a corresponding special access code, are members of a certain fan club, and/or that have a certain type/brand of credit card.

At block 308, special offers (e.g., associated with specified seats, seats of seats, and/or users) may be accessed with a data store. For example, the special offers may comprise a VIP parking offer, a free poster offer, a free audio and/or video download offer, a free or discounted food offer, an early entry offer, and/or other offer.

At block 310, the seating map may be updated using the seat status data and to indicate special offers. The seating map may graphically and/or textually depict the status of seats, restrictions on seat access, and/or special offers. Optionally, the seating map may comprise multiple layers, with different layers providing different seat-related information. For example, one layer may indicate seat availability, another layer may indicate seat prices, another layer may indicate restrictions on seat access, and another layer may indicate special offers as similarly discussed elsewhere herein.

At block 312, an image of the updated seating map (optionally comprises of one or multiple layers) may be inserted into a video stream (e.g., via a H.264, HEVC, VP9, and/or AV1 codec, using the RTP, HLS or DASH protocols, using an MP4, MOV, AVI, WMV, AVCHD, WebM, or FLV video format). For example, an actual or virtual, digital image of the seat map may be captured and converted to one or more video frames. The video stream, comprising the updated seat map, may be transmitted as a video stream to one or many (e.g., thousands) of user devices at the same time. The updated seat map may be rendered by clients (e.g., browsers, dedicated ticketing applications, and/or the like) on the user devices. The updated seat map may be interactive, where a user can select one or more seats (e.g., by touching or clicking on corresponding representations of seats) that are indicated as available. Optionally, once the user selects available seats, the seats may be placed in a reserved state for a specified period of time, in which the user needs to complete a ticket purchase process. If the user does not complete the ticket purchase process within the specified period of time, the seats may be released. If the user does complete the ticket purchase process within the specified period of time, the seat tickets will be assigned to the user.

Where the seat map is composed of layers, clients on user devices will appropriately render the layers.

At block 314, a change in seat status may be detected (e.g., from information provided via an inventory database or other source described herein). If there is a detected change in seat status, the process may proceed back to block 310, and the seat map may be accordingly updated and broadcast to users at block 312. The foregoing process may be performed in real time, and potentially each frame of the video stream may include a newly updated seat map. Of course, if there is no change in seat status, each frame may include the same image of the seat map until a seat status change is detected.

Optionally, where the seat map is composed of multiple layers, only the layers that include a change are broadcast to user devices, thereby reducing network and computer resource utilization.

Figure 4:
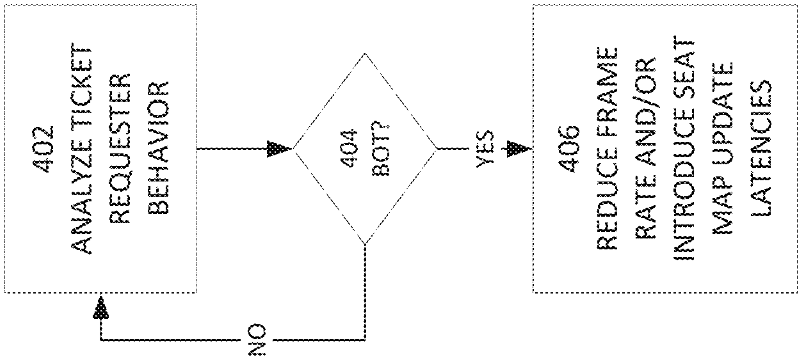

FIG. 4 illustrates an example process for inhibiting access to resources, such as seat tickets, by automated programs, such as seat ticket bots. At block 402, certain behavior associated with a device attempting to make a ticket purchase may be monitored and analyzed. For example, as discussed elsewhere herein, device sessions with the ticketing system may be analyzed for unusual patterns, such as rapid and repetitive requests that are indicative of an automated program. By way of further example, user interactions such as mouse movements, clicks, and/or navigation patterns, may be monitored and patterns associated with automated programs may be detected. By way of further example, sudden spikes in traffic or abnormal purchasing patterns, which may be indicative of bot activity, may be detected.

Using the detections and analysis of block 402, at block 404, a determination may be made as to whether the device attempting to make a ticket purchase is being operated by an automated program, such as a ticket bot. For example, once suspected bot activity has been detected, the suspected bot activity may be scored, and if the score exceeds a corresponding threshold, the source of the activities may be classified as a bot.

If a determination is made that the device attempting to make a ticket purchase is being operated by an automated program, such as a ticket bot, remediation acts may be performed at block 406. For example, in order to slow down a ticket bot and prevent or inhibit the ticket bot from successfully acquiring tickets, updates to seat maps transmitted to the bot source may slowed so as introduce significant update latencies (e.g., 3-10 seconds) and/or the frame rate to the bot source may be reduced (e.g., to one-third (e.g., 10 Hz) or less of the frame rate for legitimate user devices (e.g., 30 Hz)).

Figure 5:
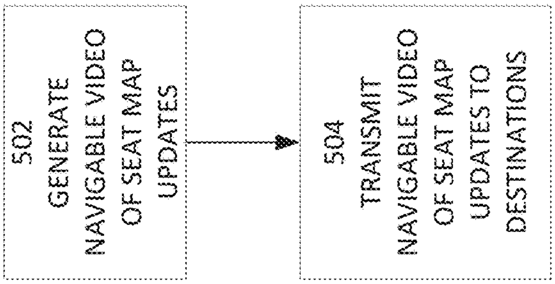

FIG. 5 illustrates an example process of generating a navigable video of images of dynamic changes to status changes in a ticketed event seat map (where the navigable video may be rewound, fast forwarded, or paused, and/or where a viewer may jump to a desired position using a control, such as a scrubber). The process may be performed in real time during the sale of event seat tickets and/or after the sale of event seat tickets.

At block 502, a history of time stamped status changes to a seat map or other synchronization maker (e.g., reflecting when seat status changed from available to reserved, from reserved to sold, from reserved to freed, etc.) may be used to generate a navigable video of seat map status changes, via which a viewer may rewind, fast forward and pause the video. For example, the navigable video of seat map status changes may be time stamped (e.g., each frame may be time stamped and/or each change in seat map status change may be time stamped) or other has have frame sequence identifiers so that it can be determined when in a given onsale a given seat status changed. At block 504, the video of the seat map status changes may be transmitted to one or more destinations (e.g., an electronic address of a venue operator for the event, an event promoter, an event performer, and/or other interested entity). Optionally, the generated video may be hosted by the resource allocation system and access to video may be provided via streaming to one or more authorized entities. Optionally, a download control may be provided which when activated causes the video to be downloaded to a destination specified by the recipient.

Thus, aspects of the present disclosure relate to the generation and transmission of real time updates to seating maps. Additional aspects of the present disclosure relate to controlling access to resources with respect to bots. Still other aspects of the present disclosure relate to the generation of video content depicting changes in status of event seats.

Certain aspects will now be described, where any of the aspects may be used singly or in combination with other aspects.

An aspect of the present disclosure relates to a system configured to stream images, comprising: a network interface; at least one processing device operable to: access a seat map for an event at a venue; access a current status of seats rendered in the seat map; update the seat map to indicate the current status of seats rendered in the seat map; generate, in real time, a video stream comprising the updated seat map indicating the current status of seats rendered in the seat map, and stream the updated seat map in real time via the video stream to a plurality of clients, comprising respective video decoders, hosted on user devices; detect, via a message received from a first user device via the network interface, a selection of a first seat via the updated seat map; associate a seat token (e.g., a seat ticket) for the first seat with a user and store the association of the seat token for the selected seat with the user in memory; at least partly in response to processing the association of the seat token for the first seat with the user, update the seat map to indicate a change in status of the first seat in the seat map; and transmit, in real time, via the video stream, the updated seat map indicating the change status of the first seat in the seat map to at least a portion of the plurality of clients, comprising respective video decoders, hosted on user devices.

Optionally, the video stream is streamed using RTP encapsulated within RTMP. Optionally, the video stream is in a range of 30 to 60 frames per second. Optionally, latency in the stream of the updated seat map to the plurality of clients, comprising respective video decoders, hosted on user devices is in a range of 0.033 seconds to 0.017 seconds. Optionally, the frame rate may be dynamically changed based at least in part on the frequency of changes in seat status. Optionally, updates and transmission of a seat map may be event driven, wherein seat map updates are generated and transmitted at least partially in response to a change in a seat status.

Optionally, the system is operable to determine that token requests are being received at the system from an automated program; and at least partly in response to determining that token requests are being received at the system from the automated program, introduce a first latency with respect to seat map updates transmitted via the video stream to the automated program. Optionally, the system is operable to access images of respective seat map updates; generate a navigable video file of the images of respective seat map updates with associated timing information; and provide access to the navigable video file of the images of respective seat map updates with the associated timing information to one or more entities. Optionally, the seating map comprises a plurality of layers including: a layer indicating a status of a plurality of seats, the status indicating whether a seat is available or unavailable; and a layer indicating whether an access code is needed to obtain a token for one or more seats. Optionally, the seating map comprises a plurality of layers including: a user interaction layer, a local state layer, a seat map layer, and a display map layer.

An aspect of the present disclosure relates to a computer-implemented method, the method comprising: accessing, via a computer system comprising one or more computing devices and a network interface, a seat map for an event at a venue; accessing, via the computer system, a current status of seats rendered in the seat map; generating, in real time, a video stream comprising an updated seat map indicating the current status of seats rendered in the seat map, and streaming the updated seat map in real time via the video stream to a plurality of clients, comprising respective video decoders, hosted on user devices; detecting, via a message received from a first user device via the network interface, a selection of a seat depicted in the updated seat map; associating a seat token (e.g., a seat ticket) for the first seat with a user; updating the seat map to indicate a change in status of the first seat in the seat map; and transmitting, in real time, via the video stream, the updated seat map indicating the change status of the first seat in the seat map to one or more clients hosted on user devices.

Optionally, the video stream is streamed using RTP encapsulated within RTMP. Optionally, the video stream is in a range of 30 to 60 frames per second. Optionally, latency in the stream of the updated seat map to the plurality of clients, comprising respective video decoders, hosted on user devices is in a range of 0.033 seconds to 0.017 seconds. Optionally, the frame rate may be dynamically changed based at least in part on the frequency of changes in seat status. Optionally, updates and transmission of a seat map may be event driven, wherein seat map updates are generated and transmitted at least partially in response to a change in a seat status. Optionally, the method further comprises determining that token requests are being received at the system from an automated program; and at least partly in response to determining that token requests are being received at the system from the automated program, introducing a first latency with respect to seat map updates transmitted via the video stream to the automated program. Optionally, the method further comprises accessing images of respective seat map updates; generating a navigable video file of the images of respective seat map updates with associated timing information; and providing access to the navigable video file of the images of respective seat map updates with the associated timing information to one or more entities. Optionally, the seating map comprises a plurality of layers including: a layer indicating a status of a plurality of seats, the status indicating whether a seat is available or unavailable; and a layer indicating whether an access code is needed to obtain a token for one or more seats. Optionally, the seating map comprises a plurality of layers including: a user interaction layer, a local state layer, a seat map layer, and a display map layer.

An aspect of the present disclosure relates to a non-transitory computer readable memory that stores instructions, that when executed by a computer system comprising one or more computing devices, cause the computer system to perform operations comprising: access a current status of seats in a seat map; update the seat map to indicate the current status of seats rendered in the seat map; generate, in real time, a video stream comprising the updated seat map indicating the current status of seats rendered in the seat map, and stream the updated seat map in real time via the video stream to clients hosted on user devices; detect, via a message received from a first user device, a selection of a seat; associate a seat token (e.g., a seat ticket) for the first seat with a user; update the seat map to indicate a change in status of the first seat in the seat map; and transmit, in real time, via the video stream, the updated seat map indicating the change status of the first seat in the seat map to clients hosted on user devices.

Optionally, the video stream is streamed using RTP encapsulated within RTMP. Optionally, the video stream is in a range of 30 to 60 frames per second. Optionally, latency in the stream of the updated seat map to the plurality of clients, comprising respective video decoders, hosted on user devices is in a range of 0.033 seconds to 0.017 seconds. Optionally, the operations further comprise determining that token requests are being received at the system from an automated program; at least partly in response to determining that token requests are being received at the system from the automated program, introduce a first latency with respect to seat map updates transmitted via the video stream to the automated program. Optionally, the operations further comprise accessing images of respective seat map updates; generating a navigable video file of the images of respective seat map updates with associated timing information; and providing access to the navigable video file of the images of respective seat map updates with the associated timing information to one or more entities. Optionally, the seating map comprises a plurality of layers including: a layer indicating a status of a plurality of seats, the status indicating whether a seat is available or unavailable; and a layer indicating whether an access code is needed to obtain a token for one or more seats. Optionally, the seating map comprises a plurality of layers including: a user interaction layer, a local state layer, a seat map layer, and a display map layer.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, “can,” “may,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Disjunctive language such as the phrase “at least one of X, Y, Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase “click” may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to stream video content comprising a seating map reflecting status changes with respect to seat availability in substantially real time, the system comprising:

a network interface;

at least one processing device operable to:

access from memory a seat map for an event at a venue, the seat map comprising a plurality of layers;

access a current status of seats rendered in the seat map comprising a change of status for a first set of seats and a change of status for a second set of seats;

generate a first view of the seat map reflecting the change of status for the first set of seats and the change of status for the second set of seats;

generate a second view of the seat map reflecting the change of status for the first set of seats and masking the change of status for the second set of seats;

stream over a network via the network interface, in real time, in a first video stream the first view of the seat map as at least one video frame associated with a first timestamp, the first view of the seat map reflecting the change of status for the first set of seats and the change of status for the second set of seats, to a first plurality of clients hosted on respective user devices, the respective user devices associated with respective users that have a first common characteristic;

stream over the network via the network interface, in real time, in a second video stream the second view of the seat map as at least one video frame, reflecting the change of status for the first set of seats and masking the change of status for the second set of seats, to a second plurality of clients hosted on respective user devices, the respective user devices associated with respective users lacking the first common characteristic;

detect, via a message received from a first user device via the network interface, a selection of a first seat via the first view of the seat map reflecting the change of status for the first set of seats and the change of status for the second set of seats;

synchronize a transaction feed with the streaming of the first view of the seat map using the first timestamp, the transaction feed reflecting the selection of the first seat via the first view of the seat map;

associate a seat token for the first seat with a user and store the association of the seat token for the selected seat with the user in memory;

at least partly in response to processing the association of the seat token for the first seat with the user, update the seat map in real time to indicate a change in status of the first seat in the seat map to create an updated seat map; and transmit, in real time, via the first and second video streams, the updated seat map via at least one video frame, the updated seat map indicating the change in status of the first seat, to one or more clients hosted on respective user devices;

wherein the system is configured to reduce a frame rate of a given video stream of a given seat map to a given client at least partly in response to determining that a bot is accessing the system via the given client.

2. The system as defined in claim 1, wherein the first video stream is streamed using RTP encapsulated within RTMP.

3. The system as defined in claim 1, wherein the first video stream is at a fixed frame rate.

4. The system as defined in claim 1, wherein the system is operable to:

determine that token requests are being received at the system from an automated program; and at least partly in response to determining that token requests are being received at the system from the automated program, introduce a first latency with respect to seat map updates transmitted via the second video stream to the automated program.

5. The system as defined in claim 1, wherein latency in the stream of the updated seat map to one or more clients is in a range of 0.033 seconds to 0.017 seconds.

6. The system as defined in claim 1, wherein the system is operable to:

access images of respective seat map updates;

generate a navigable video file of the images of respective seat map updates with associated timing information; and provide access to the navigable video file of the images of respective seat map updates with the associated timing information to one or more entities.

7. The system as defined in claim 1, wherein the updated seat map includes a layer indicating whether an access code is needed to obtain a token for one or more seats.

8. The system as defined in claim 1, wherein the updated seat map includes a local state layer configured as a local state cache that keeps track of seat state changes comprising state changes that have not yet been received by a seat inventory server.

9. A computer-implemented method, the method comprising:

accessing from memory, via a computer system comprising one or more computing devices and a network interface, a seat map for an event at a venue, the seat map comprising a plurality of layers;

accessing via the computer system a current status of seats rendered in the seat map comprising a change of status for a first set of seats and a change of status for a second set of seats;

generating a first view of the seat map reflecting the change of status for the first set of seats and the change of status for the second set of seats;

generating a second view of the seat map reflecting the change of status for the first set of seats and masking the change of status for the second set of seats;

streaming over a network via the network interface, in real time, in a first video stream the first view of the seat map as at least one video frame associated with a first timestamp, the first view of the seat map reflecting the change of status for the first set of seats and the change of status for the second set of seats, to a first plurality of clients hosted on respective user devices, the respective user devices associated with respective users that have a first common characteristic;

streaming over the network via the network interface, in real time, in a second video stream the second view of the seat map as at least one video frame, reflecting the change of status for the first set of seats and masking the change of status for the second set of seats, to a second plurality of clients hosted on respective user devices, the respective user devices associated with respective users lacking the first common characteristic;

detecting, via a message received from a first user device via the network interface, a selection of a first seat via the first view of the seat map reflecting the change of status for the first set of seats and the change of status for the second set of seats;

synchronizing a transaction feed with the streaming of the first view of the seat map using the first timestamp;

associating a seat token for the first seat with a user and storing the association of the seat token for the first seat with the user in memory;

at least partly in response to processing the association of the seat token for the first seat with the user, updating the seat map in real time to indicate a change in status of the first seat in the seat map to create an updated seat map; and transmitting, in real time, via the first and/or second video streams, the updated seat map via at least one video frame, the updated seat map indicating the change in status of the first seat, to one or more clients hosted on respective user devices;

reducing a frame rate of a given video stream of a given seat map to a given client at least partly in response to determining that a bot is accessing the system via the given client.

10. The method as defined in claim 9, wherein the first video stream is streamed using RTP encapsulated within RTMP.

11. The method as defined in claim 9, wherein the first video stream is at a fixed frame rate.

12. The method as defined in claim 9, the method further comprising:

determining that token requests are being received at the system from an automated program; and at least partly in response to determining that token requests are being received at the system from the automated program, introducing a first latency with respect to seat map updates transmitted via the second video stream to the automated program.

13. The method as defined in claim 9, wherein latency in the stream of the updated seat map to one or more clients is in a range of 0.033 seconds to 0.017 seconds.

14. The method as defined in claim 9, the method further comprising:

accessing images of respective seat map updates;

generating a navigable video file of the images of respective seat map updates with associated timing information; and providing access to the navigable video file of the images of respective seat map updates with the associated timing information to one or more entities.

15. The method as defined in claim 9, wherein the updated seat map includes a layer indicating whether an access code is needed to obtain a token for one or more seats.

16. The method as defined in claim 9, wherein the updated seat map includes a local state layer configured as a local state cache that keeps track of seat state changes comprising state changes that have not yet been received by a seat inventory server.

17. Non-transitory computer readable memory that stores instructions, that when executed by a computer system comprising one or more computing devices, cause the computer system to perform operations comprising:

access from memory a seat map for an event at a venue, the seat map comprising a plurality of layers;

access a current status of seats rendered in the seat map comprising a change of status for a first set of seats and a change of status for a second set of seats;

generate a first view of the seat map reflecting the change of status for the first set of seats and the change of status for the second set of seats;

generate a second view of the seat map reflecting the change of status for the first set of seats and masking the change of status for the second set of seats;

stream over a network, in real time, in a first video stream the first view of the seat map as at least one video frame, the first view of the seat map reflecting the change of status for the first set of seats and the change of status for the second set of seats, to a first plurality of clients hosted on respective user devices, the respective user devices associated with respective users that have a first common characteristic;

stream over the network, in real time, in a second video stream the second view of the seat map as at least one video frame, reflecting the change of status for the first set of seats and masking the change of status for the second set of seats, to a second plurality of clients hosted on respective user devices, the respective user devices associated with respective users lacking the first common characteristic;

detect, via a message received from a first user device, a selection of a first seat via the first view of the seat map reflecting the change of status for the first set of seats and the change of status for the second set of seats;

associate a seat token for the first seat with a user and store the association of the seat token for the first seat with the user in memory;

at least partly in response to processing the association of the seat token for the first seat with the user, update the seat map in real time to indicate a change in status of the first seat in the seat map to create an updated seat map; and transmit, in real time, via at least one video stream, the updated seat map via at least one video frame, the updated seat map indicating the change in status of the first seat, to one or more clients hosted on respective user devices;

reduce a frame rate of a given video stream of a given seat map to a given client at least partly in response to determining that a bot is accessing the system via the given client.

18. The non-transitory computer readable memory as defined in claim 17, wherein latency in the stream of the updated seat map to the clients, comprising respective video decoders, hosted on respective user devices is in a range of 0.033 seconds to 0.017 seconds.

19. The non-transitory computer readable memory as defined in claim 17, the operations further comprising:

determining that token requests are being received at the system from an automated program;

at least partly in response to determining that token requests are being received at the system from the automated program, introducing a first latency with respect to seat map updates transmitted via the second video stream to the automated program.

20. The non-transitory computer readable memory as defined in claim 17, the operations further comprising:

accessing images of respective seat map updates;

generating a navigable video file of the images of respective seat map updates with associated timing information; and providing access to the navigable video file of the images of respective seat map updates with the associated timing information to one or more entities.

21. The non-transitory computer readable memory as defined in claim 17, wherein the updated seat map includes a local state layer configured as a local state cache that keeps track of seat state changes comprising state changes that have not yet been received by a seat inventory server.

* * * * *